US007925631B1

United States Patent
Thillai et al.

(10) Patent No.: US 7,925,631 B1
(45) Date of Patent: Apr. 12, 2011

(54) METHOD AND SYSTEM FOR REPORTING INCONSISTENCY OF FILE SYSTEM PERSISTENT POINT IN TIME IMAGES AND AUTOMATICALLY THAWING A FILE SYSTEM

(75) Inventors: Kumaravel Thillai, Bangalore (IN); Rupesh Nasre, Bangalore (IN); Aditya Vishwanath, Bangalore (IN)

(73) Assignee: Network Appliance, Inc., Sunnyvale, CA (US)

( * ) Notice: Subject to any disclaimer, the term of this patent is extended or adjusted under 35 U.S.C. 154(b) by 862 days.

(21) Appl. No.: 11/836,070

(22) Filed: Aug. 8, 2007

(51) Int. Cl.
*G06F 7/00* (2006.01)
(52) U.S. Cl. .................... 707/649; 707/704
(58) Field of Classification Search .......... 707/644, 707/649, 687, 690, 702, 704
See application file for complete search history.

(56) References Cited

U.S. PATENT DOCUMENTS

| | | | |
|---|---|---|---|
| 5,193,178 A * | 3/1993 | Chillarege et al. | 714/25 |
| 5,892,954 A * | 4/1999 | Tomas et al. | 710/200 |
| 6,108,654 A * | 8/2000 | Chan et al. | 1/1 |
| 6,301,676 B1 * | 10/2001 | Kumar et al. | 714/11 |
| 6,647,473 B1 * | 11/2003 | Golds et al. | 711/161 |
| 7,058,629 B1 * | 6/2006 | Colrain et al. | 710/200 |
| 7,069,401 B1 * | 6/2006 | Noonan et al. | 711/162 |
| 2005/0256859 A1 * | 11/2005 | Keohane et al. | 707/4 |
| 2006/0155946 A1 * | 7/2006 | Ji | 711/162 |

* cited by examiner

*Primary Examiner* — John R. Cottingham
*Assistant Examiner* — James E Richardson
(74) *Attorney, Agent, or Firm* — Blakely, Sokoloff, Taylor & Zafman LLP

(57) ABSTRACT

A process such as a snapshot creation application process freezes a file system upon initiating a process to create a snapshot of a file system or a part thereof. Upon freezing the file system, the snapshot application process causes a second process to make a change to the file system. If the change is successfully made before the snapshot creation application process tries to thaw the file system, the second process sends a signal back to the snapshot application. Upon receiving a signal from the second process, the snapshot creation application process outputs a warning to a user that the snapshot is inconsistent. The snapshot application also causes a third process to automatically thaw the file system, if a certain period of time has passed and the third process has not received a signal from the snapshot application process indicating the snapshot has been successfully created.

15 Claims, 7 Drawing Sheets

US 7,925,631 B1

METHOD AND SYSTEM FOR REPORTING INCONSISTENCY OF FILE SYSTEM PERSISTENT POINT IN TIME IMAGES AND AUTOMATICALLY THAWING A FILE SYSTEM

FIELD OF THE INVENTION

At least one embodiment of the present invention pertains to storage systems, and more particularly, to creating a persistent point in time image of a data set.

BACKGROUND

A network storage server is a processing system adapted to store and retrieve data on behalf of one or more client processing systems ("clients") in response to external input/output (I/O) requests received from clients. A storage server can provide clients with a file-level access to data stored in a set of mass storage devices, such as magnetic or optical storage disks or tapes. Alternatively, a storage server can provide clients with a block-level access to stored data, rather than file-level access or with both file-level access and block-level access.

Data storage space maintained by a storage server can be organized as one or more storage "volumes" comprising physical storage disks (or other mass storage devices), defining an overall logical arrangement of storage space. The disks within a volume/file system can be organized as one or more groups of Redundant Array of Independent (or Inexpensive) Disks (RAID).

A client's local file system or a part of its local file system (e.g., a directory may be mapped to a volume of the storage server. An access request (e.g., read, write, etc.) directed to the local file system mapped to the volume may be forwarded by the client to the storage server. Application data sent to the storage server from the client may be divided up into fixed-size physical data blocks stored on disks within the mapped volume. To facilitate access to the data blocks, the storage server implements a file system that logically organizes information as a hierarchical structure of named directories and files on the disks.

Some known file systems, including the Write Anywhere File Layout (WAFL®) file system, provided by Network Appliance, Inc., of Sunnyvale, Calif., provide capability for creating "snapshots" of a volume. A snapshot is a persistent point-in-time (PPT) image of the volume that enables quick recovery of data in the event the data has been corrupted, lost, or altered. The terms PPT image and "snapshot" shall be used interchangeably throughout this description. "Snapshot" is used in this document without derogation of Network Appliance, Inc.'s trademark rights.

Typically, creation of snapshots can be controlled from a client-side software tool. According to a known technique, in order to ensure that the created snapshot is a consistent PPT image of the volume, the client-side software tool "freezes" the client's local file system while the snapshot is being created, i.e., prevents any client application from making changes (e.g., writing data, deleting data, etc.) to the file system, and therefore prevents the client application from making changes to the volume. A snapshot is considered as a consistent PPT image of a volume if, while the snapshot is created, the volume is not changed. However, while a snapshot is being created, an application can thaw the file system (i.e., unfreeze the file system to allow changing the file system), making some changes to the volume, and freezing the file system again before the creation of snapshot is finished. If the above scenario occurs, the created snapshot is not a consistent PPT image of the volume. That fact may not be readily apparent to any user. Thus, what is needed is a technique to automatically warn a user (e.g., a network storage system administrator) when a created snapshot is inconsistent.

SUMMARY

The present invention includes a method and system for reporting inconsistency of file system persistent point in time images and automatically thawing a file system. The phrase "thawing a file system" means unfreezing a file system to allow changes to the file system (e.g., writing data, deleting data, etc.). In one embodiment, the method comprises, in response to a file system of a processing system being frozen by a first process to prevent changes to the file system, automatically determining whether the file system is thawed by a process other than the first process before the first process tries to thaw the file system. The method further comprises outputting an indication if, according to the determination, the file system is thawed before the first process tries to thaw the file system.

In another embodiment, the method comprises, in response to the file system being frozen by the process to prevent changes to the file system, causing the process to generate a signal upon thawing the file system; and causing a different process to thaw the file system if the different process does not receive the signal within a predetermined period of time after the process froze the file system.

Other aspects of the invention will be apparent from the accompanying figures and from the detailed description which follows.

DETAILED DESCRIPTION

Figure 1:
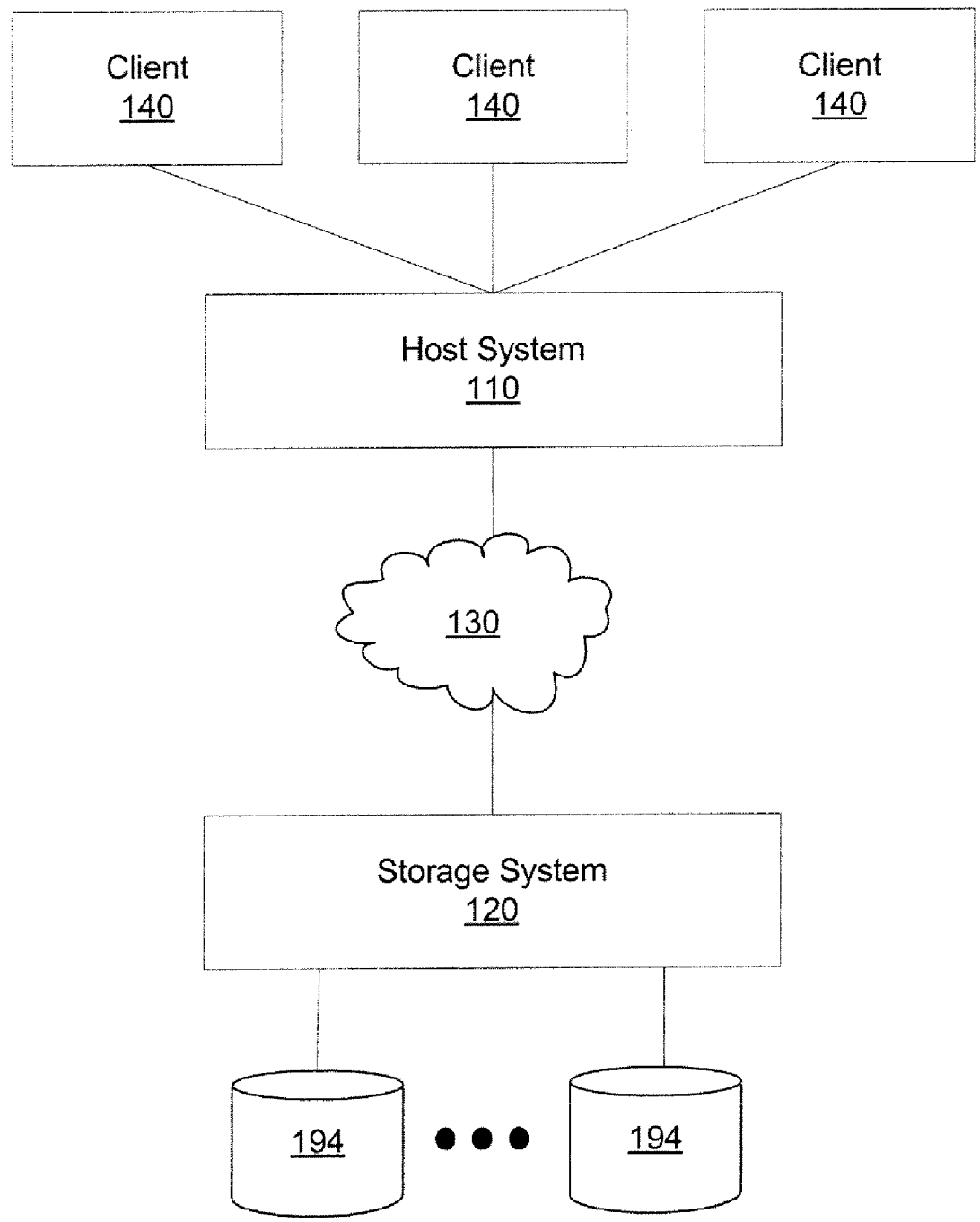
FIG. 1 is a diagram of network environment that includes a storage system and a host system capable of implementing the present invention.

A method and system for detecting and reporting inconsistency of file system point-in-time images and automatically thawing a file system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The technique introduced here includes a technique to warn a user (e.g., a network storage system administrator) if a snapshot of a volume is inconsistent. According to the technique, a snapshot creation application process running on a host system freezes a file system of the host system upon initiating a process to create a snapshot of the file system or a part of the file system (e.g., a directory). In one embodiment, the file system is mapped to a volume on a storage server. Any change to the file system is directed to the volume on the storage server. Upon freezing the file system, the snapshot creation application process causes a second process running on the host system to try to make a change to the file system (e.g., creating a file on the file system, etc.). If the change is successfully made before the snapshot creation application process tries to thaw the file system, the second process sends a signal back to the snapshot creation application process. Upon receiving such a signal from the second process, the snapshot creation application process outputs a warning to a user that the snapshot is inconsistent.

As discussed above, after the snapshot creation application process has frozen the file system, the snapshot creation application process may crash (fails) before the process unfreezes the file system, thus leaving the file system frozen. A system administrator will need to intervene to manually thaw the file system after the failure is noticed. The technique introduced here further includes a technique to automatically thaw a file system if the snapshot creation application process crashes before the process thaws the file system. To automatically thaw the file system, the snapshot creation application process, upon initiating a process to create a snapshot, causes a third process to start a timer. The timer is set to be long enough to allow creation of a snapshot. If the snapshot is created successfully, the snapshot creation application process sends a signal to the third process. However, if the timer times out and the third process still has not received a signal from the snapshot creation application process, the third process will thaw the file system automatically, and therefore prevent the file system from being frozen indefinitely.

Here, the terms "second" and "third" are used for distinguishing the processes from the snapshot creation application process. In one embodiment, the third process is spawned (i.e., created) by the snapshot application process and the second process is spawned by the third process.

In accordance with an embodiment of the present invention, FIG. 1 illustrates a host system 110 in which the present invention is implemented and a storage system 120. Host system 110 is connected to multiple clients 140.

Host system 110 can be a computer that handles requests for data, electronic mail, file transfers, and other network services from other computers, i.e., clients 140. As will be described in greater detail herein, host system 110 may execute Microsoft™ Exchange Server and Microsoft™ SQL Server, both products provided by Microsoft Corp., of Redmond, Wash. Microsoft Exchange Server is a messaging and collaboration software system that provides support for electronic mail (e-mail) to various clients (such as clients 140) connected to host system 110. Microsoft SQL Server is a relational database management system. A person of ordinary skill in the art would understand that although the present invention is described in the context of Microsoft Exchange Server and Microsoft SQL Server for illustrative purposes only, and host system 110 can execute any other application. Host system 110 can be connected to clients 140 over a network, such as a Local Area Network (LAN), Wide Area Network (WAN), Global Area Network (GAN) such as the Internet, or the like.

Host system 110 utilizes services of storage system 120 to store and manage data, such as files, in a set of mass storage devices 194, such as magnetic or optical storage based disks or tapes. Interaction between host system 110 and storage system 120 can enable the provision of storage services. That is, host system 110 may request the services of the storage system 120, and the storage system 120 may return the results of the services requested by the host system 110, by exchanging packets over the connection system 130. The host system 110 may issue packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the host system 110 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Storage system 120 is coupled to host system 110 over connection system 130, such as a local area network (LAN), a wide area network (WAN), metropolitan are network (MAN) or the Internet.

As described herein, storage system 120 stores data on one or more writable storage device media, such as magnetic disks, video tape, optical, DVD, magnetic tape, and/or any other similar media adapted to store information, including data and parity information. As illustratively described herein, the information is assumed to be stored on the disks 194. The disks 194 within a volume are typically organized as one or more groups of Redundant Array of Independent (or Inexpensive Disks (RAID).

Figure 2A:
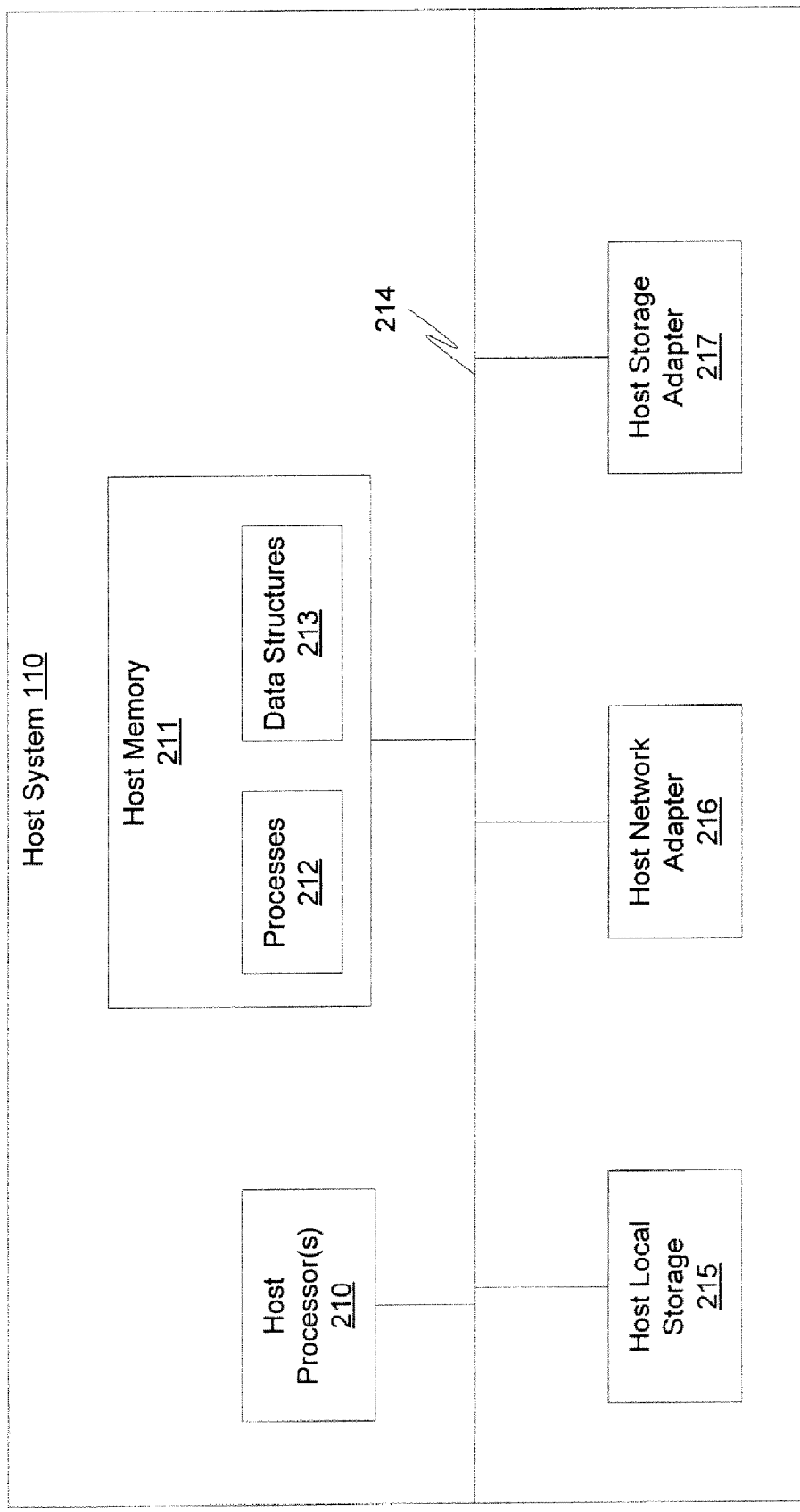
FIG. 2A is a block diagram illustrating various components of the host system shown in FIG. 1 according to an embodiment of the present invention.

Referring now to FIG. 2A, host system 110 comprises host processor(s) 210, host memory 211, a host network adapter 216, a host storage adapter 217, and a local storage 215 coupled by a bus 214. The host processors 210 are the central processing units (CPUs) of the host system 110 and, thus, control the overall operation of the host system 110. In certain embodiments, the host processors 210 accomplish this by executing software, such as that described in more detail herein. Host processors 210 may include one or more programmable general-purpose or special-purpose microprocessors, digital signal processors (DSPs), programmable controllers, application specific integrated circuits (ASICs), programmable logic devices (PLDs), or the like, or a combination of such devices.

Host memory 211 comprises storage locations that are addressable by the host processors 210 and adapters (a host network adapter 216 and a host storage adapter 217) for storing running processes 212 and data structures 213 associated with the present invention. The host processors 210 and adapters may, in turn, comprise processing elements and/or logic circuitry configured to execute the software code and manipulate various data structures. Host memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The host network adapter 216 comprises a plurality of ports adapted to couple the host system 110 to one or more clients 140 (shown in FIG. 1) over point-to-point links, wide area networks, virtual private networks implemented over a public network (Internet) or a shared local area network. The host network adapter 216 thus may comprise the mechanical, electrical and signaling circuitry needed to connect the node to the network.

The host storage adapter 217 cooperates with the host operating system executing on the host system 110 to access data from disks 194 (shown in FIG. 1). The host storage adapter 217 comprises a plurality of ports having input/output (I/O) interface circuitry that couples to the disks 194 over an I/O interconnect arrangement, such as a conventional high-performance, fibre channel (FC) link topology.

Host local storage 215 is a device that stores information within host system 110, such as software applications, host operating system, and data. Host system 110 loads the software applications and host operating system into host memory 211 as running processes 212.

Figure 2B:
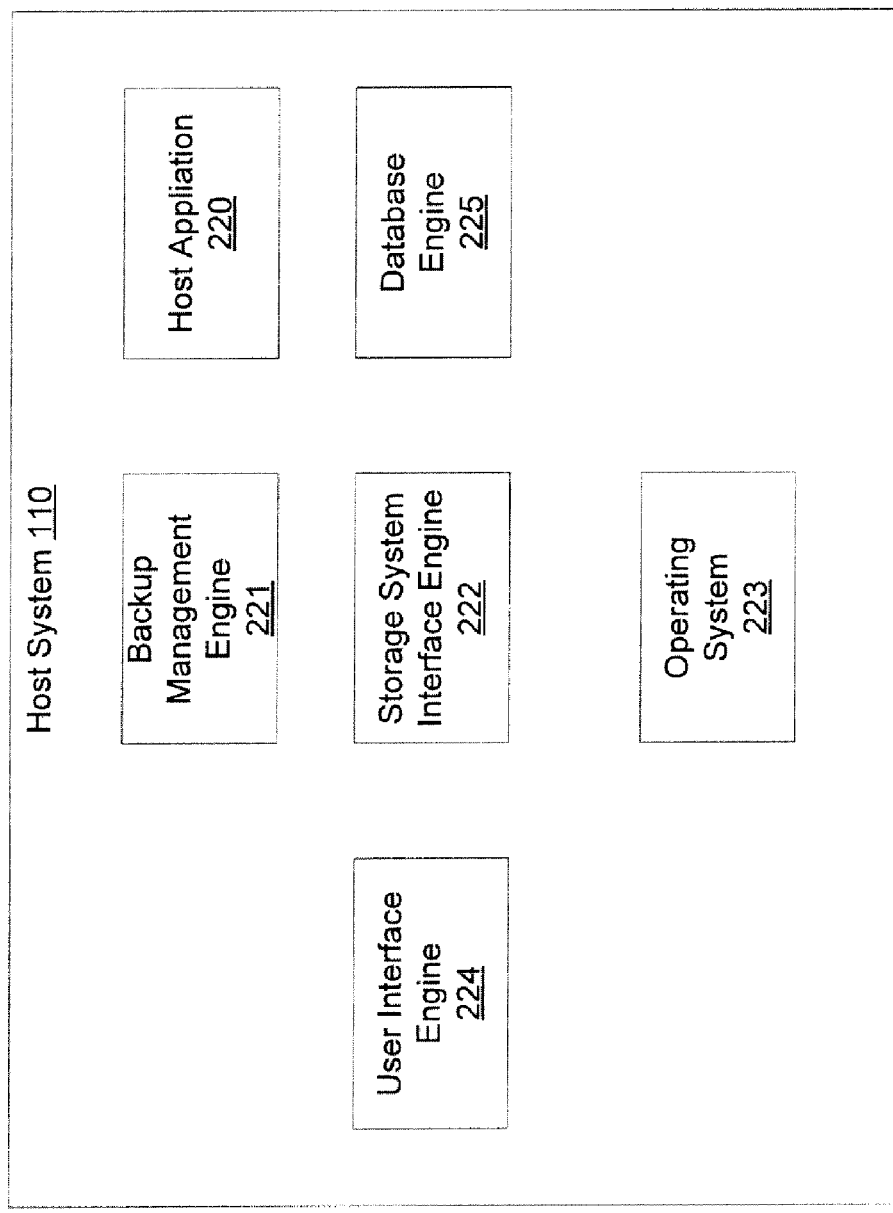
FIG. 2B is a block diagram illustrating various software components executed at the host system shown in FIG. 1 according to an embodiment of the present invention.

Referring now to FIG. 2B, according to embodiments of the present invention, host system 110 executes the following software applications: a host application(s) 220, a backup management engine 221, a user interface engine 224, a storage system interface engine 222, a host operating system 223, and a database engine 225. In one embodiment, these engines are implemented as modules. As used herein, the term "module" refers to computer program code adapted to provide the functionality attributed to the module upon execution by a processor. Host application(s) 220 can be, for example, Microsoft Exchange Server and Microsoft SQL Server, although the present invention contemplates that other host applications can be executed at host system 110. In the case of Microsoft Exchange Server, electronic messages are received from clients 140 by Microsoft Exchange Server and are passed to a database (DB) engine 225. DB Engine 225, in turn, stores the messages on disks 194 as files.

In Microsoft Exchange Server, a storage group (SG) is a unit for storing data. Each storage group may include a database file and a transaction log, which describes changes made to the database file. Backup management engine 221 causes the storage system 120 to back up storage groups using, for example, snapshot capability. A process of creating snapshots is described in U.S. patent application Ser. No. 10/090,963, entitled "System and Method for Creating a Point-in-time Restoration of Database File," of Dennis Chapman. Backup management engine 221 also causes storage system 120 to create "snapinfo" files that are stored on disk(s) 194. A snapinfo file includes information about a particular snapshot. This information may include, for example, a time stamp when a particular snapshot was taken and location where the snapshot is stored on disk(s) 194. A backup dataset includes one or more snapshots of application data. A backup dataset may further include a transaction log of changes to the application data and one or more snapinfo files describing the backup dataset.

As will be described herein in reference to FIG. 3, after backup management engine 221 initiates creation of snapshots by sending a command to storage system 120 via storage system interface engine 222, storage operating system 312 of storage system 120 (shown in FIG. 3) creates snapshots and corresponding snapinfo files. Storage operating system 312 reports back to backup management engine 221 when creation of snapshots is completed. Storage system interface engine 222 is configured to act as an interface between host system 110 and storage system 120. In one implementation, engine 222 is a SnapDrive® for Windows application, a product provided by Network Appliance, Inc., of Sunnyvale, Calif.

Host system 110 further executes the host operating system 223. Host operating system 223 is a program that is, after being initially loaded into host memory 211, manages host applications executed on host system 110. The host operating system 224 can be, for example, UNIX®, Windows NT®, Linux®, or any other general-purpose operating system.

Figure 3:
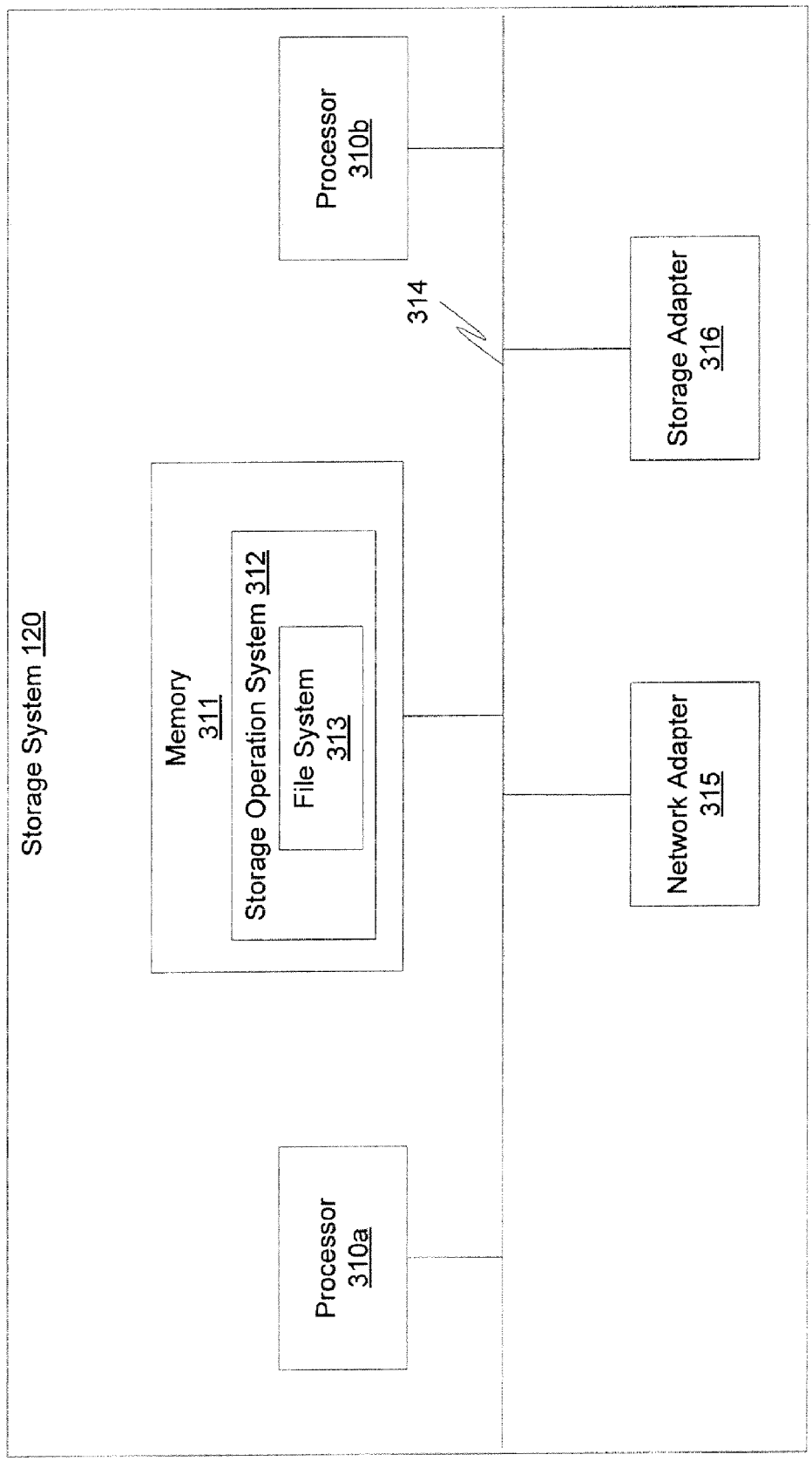
FIG. 3 is a diagram showing architecture of the storage system shown in FIG. 1 according to an embodiment of the present invention.

FIG. 3 is a diagram illustrating various components of the storage system 120, in accordance with an embodiment of the invention. Specifically, the storage system comprises a plurality of processors 310*a*, 310*b*, a memory 311, a network adapter 315, and a storage adapter 316 interconnected by a system bus 314. Storage system 120 executes a storage operating system 312 that preferably implements a high-level module, such as a file system, to logically organize the information as a hierarchical structure of named directories, files and special types of files called virtual disks (hereinafter generally "blocks") on the disks.

The memory 311 comprises storage locations that are addressable by the processors and adapters for storing software program code and data structures associated with the present invention. The processor and adapters may, in turn, comprise processing elements and/or logic circuitry configured to execute the software code and manipulate various data structures.

Storage operating system 312, portions of which are typically resident in memory 311 and executed by the processing elements, functionally organizes the storage system 120 by, inter alia, invoking storage operations in support of the storage service implemented by the storage system 120. Of course, other processing devices and memory media, including various computer readable media, may be used for storing and executing program instructions pertaining to the invention described herein. As illustrated herein, storage operating system 312 may be the NetApp® Data ONTAP® operating system available from Network Appliance Inc., of Sunnyvale, Calif., that implements a Write Anywhere File Layout (WAFL™) file system. However, other storage operating systems may also be enhanced for use in accordance with the inventive principles described herein to facilitate access to storage devices. As used herein, the term "storage operating system" refers to an operating system in a network storage system.

The file system 313 "virtualizes" the storage space provided by the disks. The file system 313 logically organizes the information as a hierarchical structure of named directory and file objects (hereinafter "directories" and "files") on the disks. Each "on-disk" file may be implemented as set of disk blocks configured to store information, such as data, whereas a directory may be implemented as a specially formatted file in which names and links to other files and directories are stored.

The network adapter 315 comprises a plurality of ports adapted to couple storage system 120 to one or more host systems 110 over point-to-point links, wide area networks, virtual private networks implemented over a public network (Internet) or a shared local area network. The network adapter 315 thus may comprise the mechanical, electrical and signaling circuitry.

The storage adapter 316 cooperates with the storage operating system 312 to access information requested by host system 110. The storage adapter 316 comprises a plurality of ports having input/output (I/O) interface circuitry that couples to the disks over an I/O interconnect arrangement, such as a conventional high-performance, FC link topology.

Figure 4:
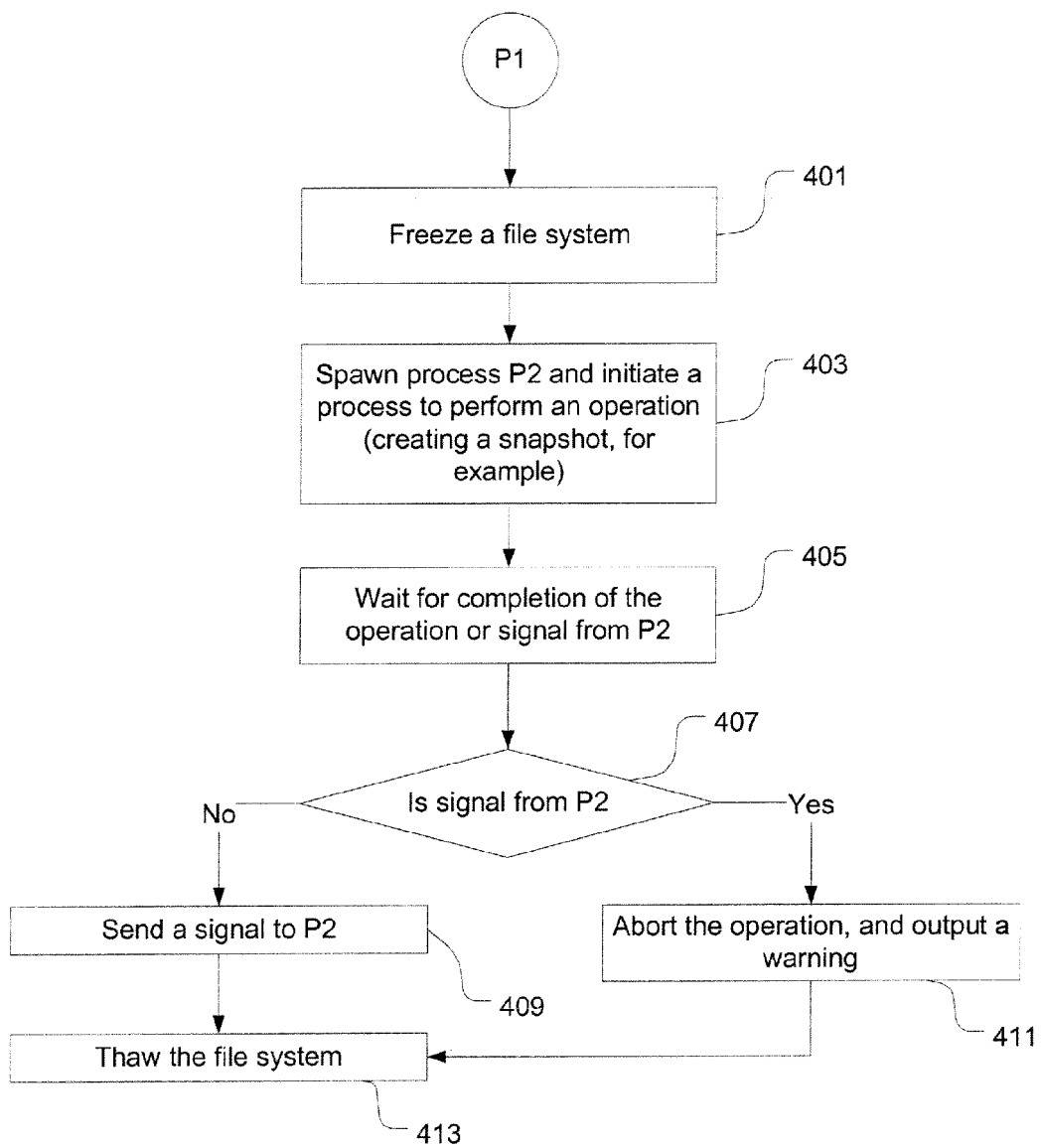
FIG. 4 is a flow diagram illustrating a process P1 of performing an operation on a file system, according to an embodiment of the present invention.

FIG. 4 is a flow diagram illustrating an example of a process P1 of performing an operation on a file system, according to an embodiment of the present invention. The process P1 illustrated in FIG. 4 may be, for example, a snapshot creation application process running on a host system 110.

At block 401, the process P1 freezes a file system on the host system 110. Typically, the host operating system 223 provides a command to freeze the file system on the host. For example, the UNIX operating system provides a command "lockfs" to freeze the file system. At block 403, the process P1 spawns a process P2 and initiates a thread to perform an operation on the file system. Such an operation may be, for example, an operation to create a snapshot of a part of the file system (e.g., a directory, etc.) As will be discussed further below, the newly spawned process P2 will send a signal to P1, if a process other than P1 thaws the file system before P4 finishes the operation, and therefore may affect the result of the operation. For example, if the operation is to create a snapshot of a part of the file system, then there is a possibility that the snapshot is inconsistent, because the file system may have been changed by the process other than P1 while the snapshot was being created.

At block 405, the process P1 waits for the completion of the operation or a signal from process P2. While the process P1 is waiting, the process may be put into a waiting or sleeping state. Unless the operation is completed or a signal from process P2 is received, the process P1 will be in the waiting or sleeping state.

At block 407, the process P1 is awakened by either the completion of the operation or the receipt of the signal from P2. If it is the receipt of the signal from P2 which awakens P1, the process P1 goes to block 411. At block 411, the process P1 aborts the operation and outputs a warning to a user. In one embodiment, the warning indicates that the snapshot is inconsistent, and therefore should be discarded. If, at block 407, the event is the completion of the operation, the process P1 goes to block 409. At block 409, the process P1 sends a signal to P2 to inform P2 that the operation has successfully completed. At block 413, the process P1 thaws the file system.

Figure 5:
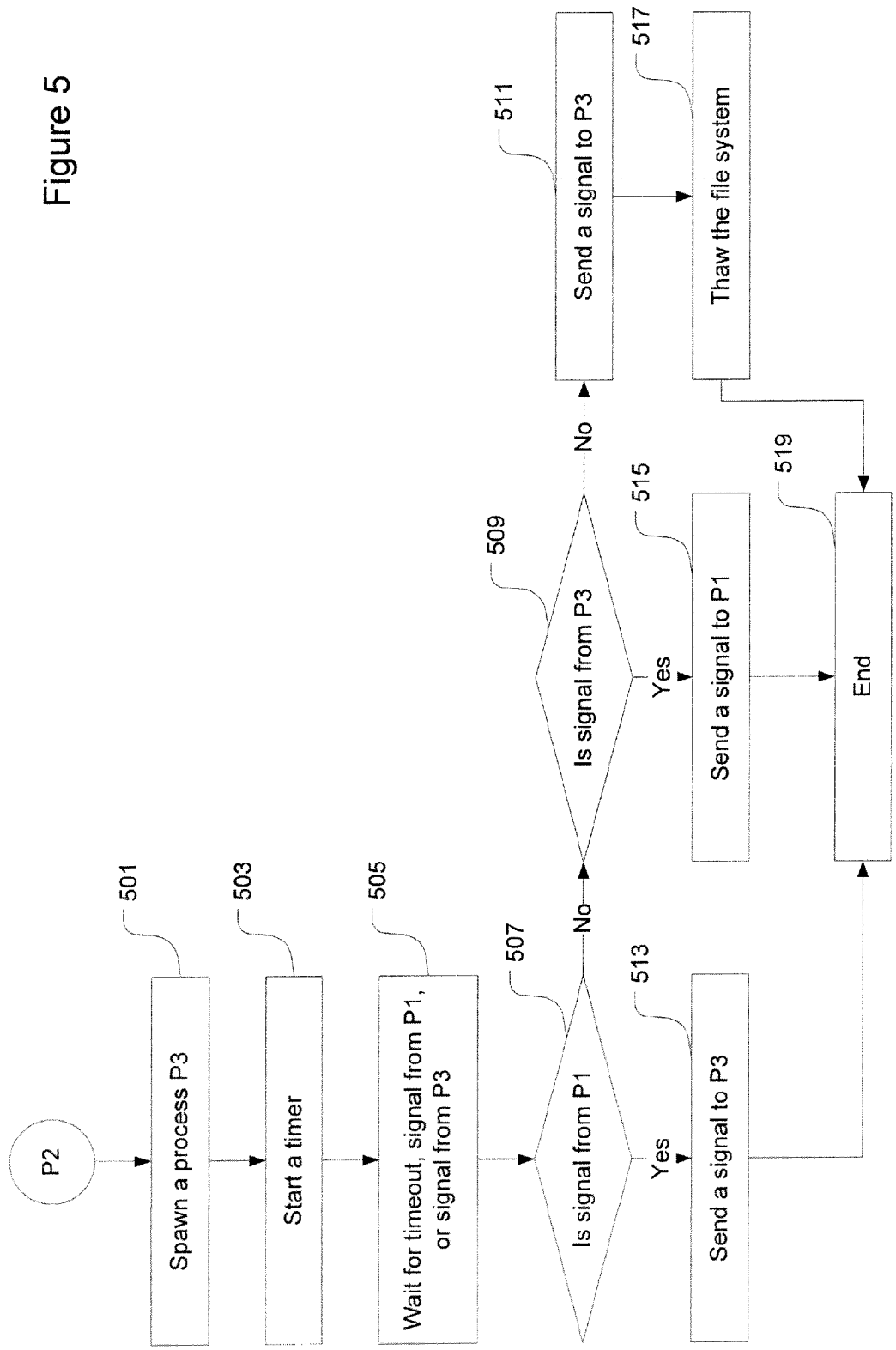
FIG. 5 is a flow diagram illustrating a process P2 spawned by the process P1 illustrated in FIG. 4, according to an embodiment of the present invention.

FIG. 5 is a flow diagram illustrating an example of the process P2 spawned by the process P1 illustrated in FIG. 4, according to an embodiment of the present invention. At block 501, the process P2 spawns a process P3. As will be discussed later, the newly spawned process P3 tries to create a file on the file system while the file system is frozen by the process P1. If the file creation attempt is successful before the process P1 tries to thaw the file system, that means that another process has thawed the file system, and therefore, P3 will send a signal to P2 which will forward the signal to P1 to inform P1 that the operation should be aborted.

Referring back to FIG. 5, at block 503, process P2 starts a timer. The timer is set to be long enough for performing the operation (e.g., creating a snapshot). At block 505, the process P2 waits for the timer's timeout, receiving a signal from P1, or receiving a signal from P3. At block 507, if the event is receiving a signal from P1, meaning the process P1 has successfully completed the operation, then, at block 513, process P2 sends a signal to P3 to terminate P3. If, however, the event is not receiving a signal from P1, the process P2 goes to block 509. At block 509, the process P2 determines whether the event is receiving a signal from P3, meaning a process has thawed the file system before the operation is completed. If the determination is positive, then at block 315, the process P2 sends a signal to P1 to inform P1 that the file system has been thawed by a process before the operation is completed. Otherwise, if the determination at block 509 is negative, the process P2 goes to block 511. If the process P2 is at block 511, then the received event is a timeout event. If a timeout occurs, a typical reason would be that the process P1 crashed before it thawed the file system. Thus, at block 511, the process P2 sends a signal to P3 to terminate P3 and, at block 517, thaws the file system to avoid the need for an administrator's manual intervention. The process P2, after either block 513, 515, or 517, goes to block 519 and terminates.

Figure 6:
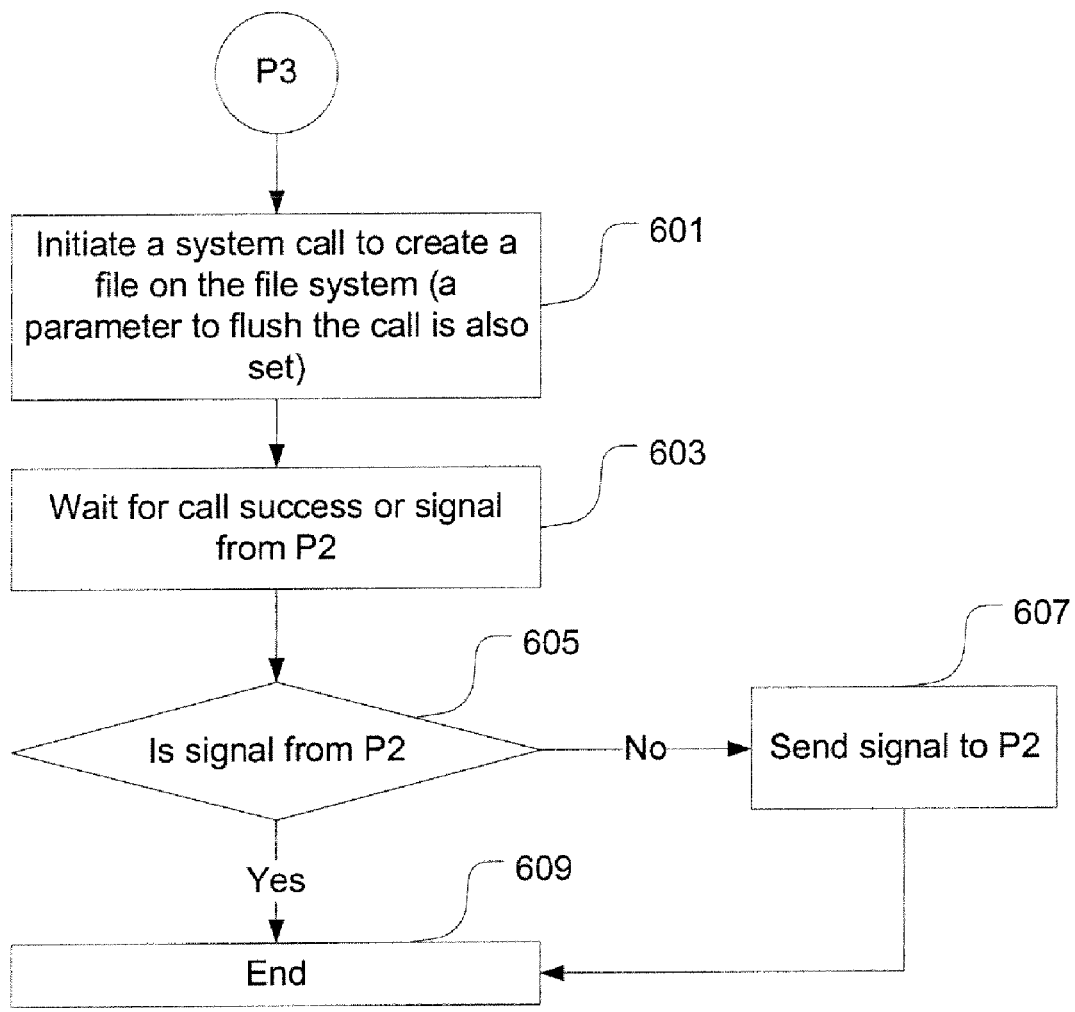
FIG. 6 is a flow diagram illustrating a process P3 spawned by the process P2 illustrated in FIG. 5, according to an embodiment of the present invention.

FIG. 6 is a flow diagram illustrating an example of the process P3 spawned by process P2 illustrated in FIG. 5, according to an embodiment of the present invention. As discussed above, the process P3 is created to determine whether a process other than process P1 thaws the file system while the file system is supposed to be frozen by the process P1. At block 601, the process P3 initiates a system call to create a file on the file system. The system call is also set to be executed immediately when the file system is allowed to do so. For example, in UNIX operating system, the system call "Open(mntpnt/tempfile, O_CREATE|O_SYNC)" may be used. The O_SYNC flag instructs the operating system to flush the changes to the disk instead of caching it. However, because the file system is frozen, any change is prevented from being flushed into disk, and therefore blocks the system call. At block 603, the process P3 waits for the event of the completion of the system call or the receipt of a signal from P2. At block 605, if the event is a signal from P2, meaning the operation has been completed successfully by P1, the process P3 goes to block 609 to terminate. If the event is the completion of the system call (determined at block 605), the process P3 sends a signal to P2 to inform P2 (which in turn informs P1) that the file system has been thawed by a process other than P1 before the operation is completed.

Note that instead of initiating a system call to create a file in the file system, the process P3 may initiate a system call to delete or modify a file already exists in the file system or other operation that can only be completed by an unfrozen file system. The illustration in FIGS. 4-6 is just one example of implementing the present invention.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Moreover, the teachings of this invention can be adapted to a variety of storage system architectures including, but not limited to, a network-attached storage (NAS) environment and a storage area network (SAN). The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "causing" or "outputting" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method comprising:
freezing, by a freezing process, a file system of a processing system, wherein the operation comprises creation of a consistent persistent point in time (PPT) image of the file system;
initiating, by a snapshot process, an operation on the file system;
initiating, by the freezing process, a verification process to determine whether a testing process, initiated by the verification process, successfully creates a file in the file system, wherein thawing the file system by a process other than the freezing process before the freezing process tries to thaw the file system allows the file to be successfully created;
if the testing process successfully creates the file, sending, by the verification process, a signal to the freezing process; and
in response to receiving the signal, outputting, by the freezing process, an indication that the file system was thawed before completion of the operation.

2. The method of claim 1, wherein at least part of the data of the file system is stored on a storage server connected to the processing system via a network.

3. The method of claim 2, wherein said indication comprises a warning that the PPT image is inconsistent.

4. The method of claim 1, further comprising automatically thawing the file system if the freezing process crashes before the first process thaws the file system.

5. The method of claim 4, wherein said automatically thawing the file system if the freezing process crashes before the freezing process thaws the file system comprises:
causing the verification process to thaw the file system if the verification process does not receive a signal indicating that the freezing process thaws the file system within a predetermined period of time after the freezing process froze the file system.

6. A method for automatically preventing a process from indefinitely freezing a file system, the method comprising:
in response to the file system being frozen by a freezing process to prevent changes to the file system, causing, by a processing device, the freezing process to generate a signal upon thawing the file system to allow changes to the file system;
initiating, by a snapshot process, an operation on the file system, wherein operation comprises creation of a consistent persistent point in time (PPT) image of the file system;
initiating, by the freezing process, a verification process to determine whether a testing process, initiated by the verification process, successfully creates a file in the file system;
if the testing process successfully creates the file, sending, by the verification process, a signal to the freezing process;
in response to receiving the signal, outputting, by the freezing process, an indication that the file system was thawed, by a process other than the freezing process, before completion of the operation; and
causing the verification process to thaw the file system if the verification process does not receive the signal from the freezing process within a predetermined period of time after the freezing process froze the file system.

7. The method of claim 6, wherein the verification process is created by the freezing process upon freezing the file system.

8. A processing system comprising:
a processor;
a storage interface through which to access a file system stored on a storage device; and
a memory coupled to the processor, the memory storing instructions which, when executed by the processor, cause the processing system to perform a method, the method comprising:
in response to the file system being frozen by a freezing process to prevent changes to the file system, causing a verification process, initiated by the freezing process, to determine whether a testing process, initiated by the verification process, successfully writes data to the file system;
initiating, by a snapshot process, an operation on the file system, wherein the operation comprises creation of a consistent persistent point in time (PPT) image of the file system;
if the testing process successfully writes data, sending, by the verification process, a signal to the freezing process; and
in response to receiving the signal, outputting, by the freezing process, a warning that the file system was thawed, by a process other than the freezing process, before completion of the operation.

9. The processing system of claim 8, further comprising a network interface to communicate with a storage server, wherein the storage server maintains at least part of the file system.

10. The processing system of claim 9, wherein said warning indicates that the PPT image is inconsistent.

11. The processing system of claim 8, wherein the method further comprises causing the verification process to thaw the file system to allow changes to the file system, if the verification process does not receive a signal indicating that the freezing process thaws the file system within a predetermined period of time after the freezing process froze the file system.

12. The processing system of claim 11, wherein the verification process is created by the freezing process upon freezing the file system.

13. A method comprising:
during a period of time when a freezing process freezes a file system to create a persistent point in time (PPT) image of the file system by a snapshot process, causing, by a processing device, a testing process, initiated by a verification process, to initiate a write operation to the file system;
determining, by the verification process, whether the write operation has been successfully performed during the period of time;
if the testing process successfully performs the write operation during the period of time, sending, by the verification process, a signal to the freezing process; and
in response to receiving the signal, generating, by the freezing process, a warning that the file system was thawed, by a process other than the freezing process, during the period of time and before creation of the PPT image.

14. The method of claim 13, wherein said warning indicates that the PPT image is inconsistent.

15. The method of claim 13, further comprising:
causing the freezing process to create the verification process in response to freezing the file system, the verification process to thaw the file system for allowing changes to the file system after a predetermined period of time since the freezing process froze the file system.

* * * * *